Oct. 15, 1935.   A. KOWALSKY   2,017,758
ENSILAGE HARVESTER
Filed Nov. 10, 1934   3 Sheets-Sheet 1

Inventor
A. Kowalsky
By V.F. Lassagne
Atty.

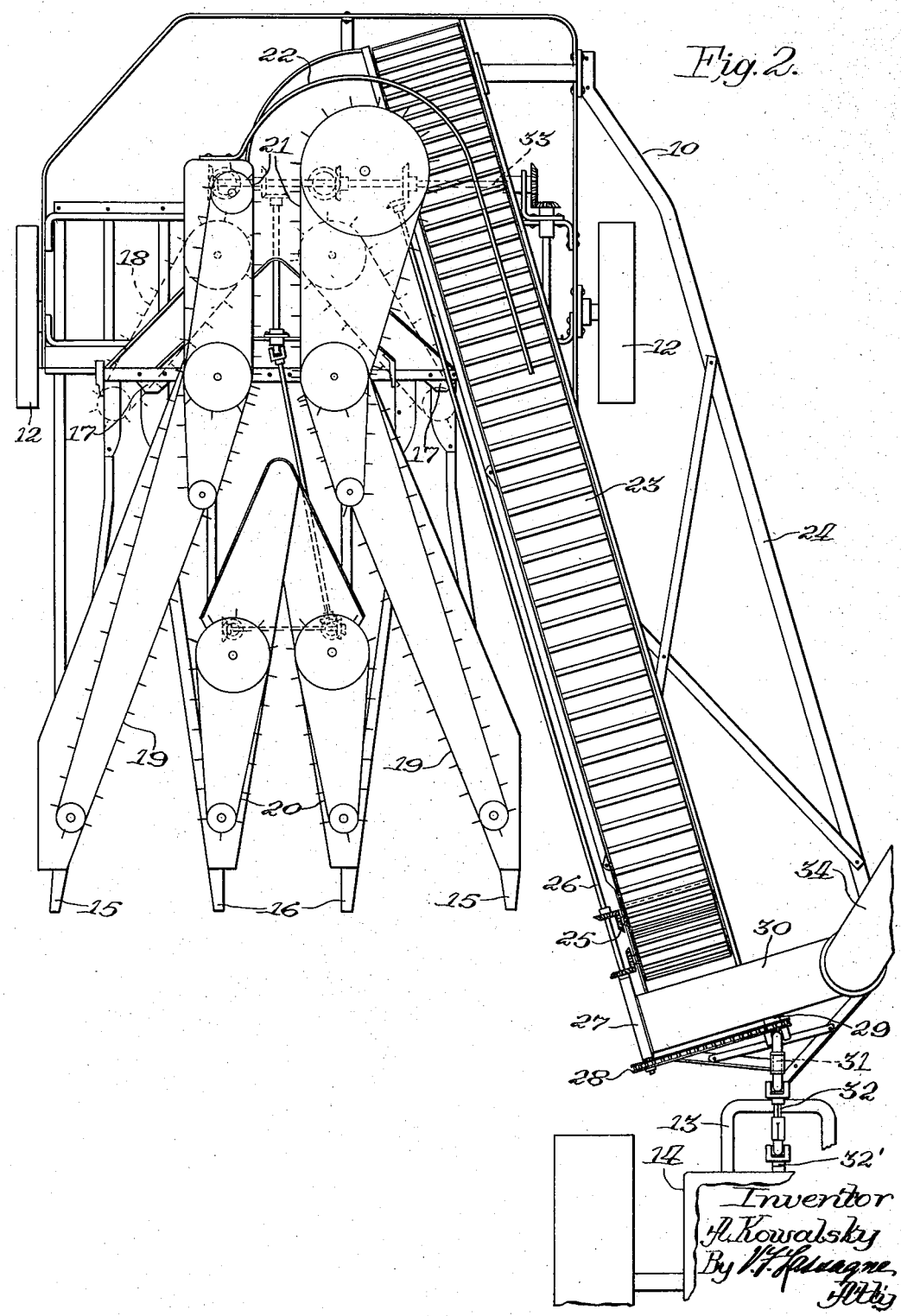

Oct. 15, 1935.  A. KOWALSKY  2,017,758
ENSILAGE HARVESTER
Filed Nov. 10, 1934 3 Sheets-Sheet 3

Inventor
A. Kowalsky
By ...
Atty.

Patented Oct. 15, 1935

2,017,758

UNITED STATES PATENT OFFICE 2,017,758

ENSILAGE HARVESTER

Andrew Kowalsky, Oak Park, Ill., assignor to International Harvester Company, a corporation of New Jersey Application November 10, 1934, Serial No. 752,405

8 Claims. (Cl. 56—16)

This invention relates to a corn harvester. More specifically, it relates to a tractor drawn and operated harvester which reduces the corn to ensilage and conveys it to a receptacle.

The principal object of the invention is to devise and construct a novel harvesting machine for cutting standing corn and reducing it to ensilage. A more specific object is to provide an ensilage harvesting machine which conveys standing stalks to a conveyer, head end first, for delivering them into a cutting device. Another object is the provision of a cutter of the axial feed type arranged in a novel manner on an ensilage harvesting frame.

The above defined objects, and others, which will be apparent from the description to follow, are accomplished by an embodiment of the invention as illustrated in the drawings, wherein:

Figure 2 is a plan view on a larger scale than Figure 1 of the harvester and a portion of the tractor showing diagrammatically the gathering, cutting and driving means, and the driving mechanisms therefor; and, Figure 3 is a side elevation of the machine as shown in Figure 2.

Figure 1:
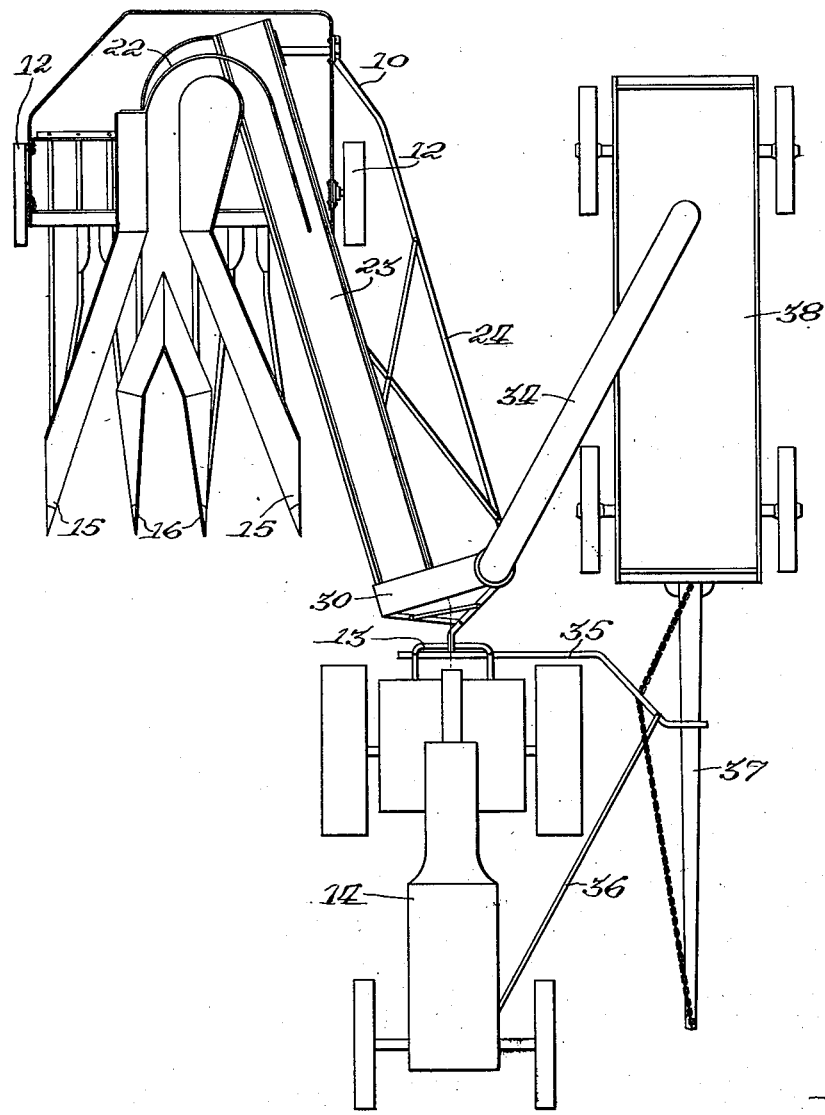
Figure 1 is a diagrammatic plan view showing a tractor with a harvester embodying the invention and a wagon drawn by the tractor for receiving ensilage.
Figure 5:
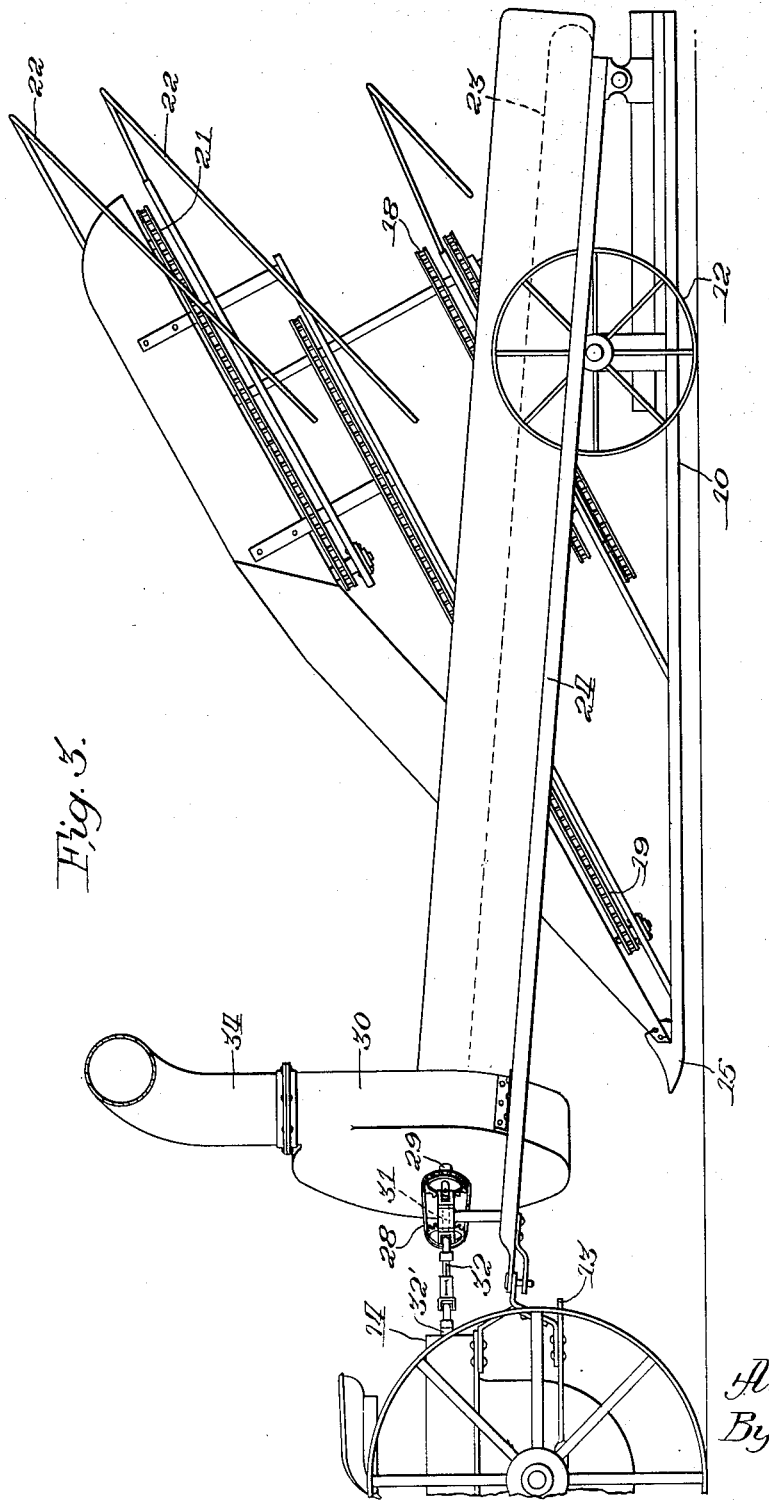

The ensilage harvester as illustrated shows a two-row machine constructed to be drawn in offset relation behind a tractor. The machine consists essentially of a frame structure 10 mounted on transversely spaced wheels 12 and pivotally connected to the drawbar 13 of a tractor 14. Said frame structure carries forwardly extending gathering means for directing two rows of corn into the machine. Only certain portions of the gathering and cutting mechanisms have been shown, as these mechanisms form a part of the present invention only in the broad sense of providing means for cutting the standing corn and conveying it rearwardly. The Kowalsky Patent No. 1,769,144 dated July 1, 1930, discloses a corn binder from which the gathering, cutting and conveying means of the present machine were taken. In applicant's device, as in the device of this patent, forwardly extending gathering members 15 and 16 direct the standing stalks into the two throats of the machine in which a reciprocating cutter 17 is mounted. The stalks are, therefore, severed near the ground and the lower ends are then conveyed inwardly toward the center of the conveyers 18 indicated in dotted lines. The top ends of the stalks are brought together by conveyers 19 located above the gathering members 15 and by conveyers 20 positioned on the gathering members 16. The stalks are, therefore carried rearwardly in a standing position through a throat portion of the machine formed between the chain conveyers 21. Said conveyers move the standing stalks rearwardly against the guide rods 22. One of the conveyers 21, which continues around adjacent the guide rods 22, carries the upper ends of the stalks forwardly until they are freed by the divergence of the conveyer and the rods, whereby the stalks are released and fall downwardly, head ends first, on a conveyer 23.

The conveyer 23 extends from the rear end of the frame structure 10 forwardly along a portion of the frame structure, which may be designated as a draft frame 24, as said portion serves to connect the harvester to the tractor. The conveyer 23 is provided in any well known manner with supporting means at each end. At the forward end, a supporting and driving roller 25 is provided with a drive gear, which engages a beveled drive gear on a drive shaft 26. Said shaft is supported in a bearing sleeve 27 at the forward end of the draft frame and extends rearwardly along said draft frame. At the forward end, a chain sprocket on the shaft 26 provides a driving means through a chain 28 mounted on a chain sprocket carried by a shaft 29. Said shaft extends into an ensilage cutter casing 30 supported at the forward end of the draft frame. The shaft 29 is driven by means of an intermediate shaft 31 connected by universal joints to the shaft 29 and to a splined power take-off shaft 32 driven from the power take-off shaft 32' of the tractor 14.

At its rear end the shaft 26 drives, through beveled gears indicated in dotted lines in Figure 2, a transverse shaft 33. Said shaft, which is suitably mounted on the frame structure, drives, through suitable gearing, the conveying and cutting mechanism of the harvester proper. As previously stated, these mechanisms are described in the Kowalsky patent referred to, and are not shown in detail and described in this application, as they do not form a part of the present invention.

The ensilage cutter 30 is of a conventional construction, such as shown in the United States patent to Ronning No. 1,815,587, dated July 21, 1931, utilized with a stalk cutting mechanism of a different construction from that forming the present invention. As in said patent, the ensilage cutter is of the axial feed type, the stalks being delivered to the face thereof by the conveyer 23 and by a feed roller 33 driven by beveled gears from the shaft 26. The cutter, being of the large diameter, blower type, is provided with an outlet to which a delivery pipe 34 is connected.

As illustrated in Figure 1, the tractor 14 is provided with a laterally extending hitch frame formed by a laterally extending member 35 secured to the drawbar 13 and by a forwardly extending member 36 secured to the tractor at a forward point thereon. Suitable means are provided for adjustably securing the tongue 37 of a wagon 38 to the draft frame formed by the members 35 and 36. The discharge pipe 34 of the ensilage cutter 30 extends upwardly, laterally and rearwardly, terminating over the wagon 38 for delivering ensilage thereto.

The operation of my improved ensilage harvester has been explained in connection with the above description. An essential feature of the machine is the delivery of stalks in a prone position on a forwardly extending conveyer of sufficient length to handle tall stalks. By providing this conveyer longitudinally of the draft frame, no additional space is required to construct it of sufficient length to receive tall stalks in the prone position. Another advantage of the structure as disclosed is that the ensilage cutter, which consumes a large percentage of the power required to operate the machine, is located closely adjacent the tractor whereby power may be transmitted through a short power take-off connection. The power for the ensilage cutter is delivered directly through the shafts substantially in alignment to the cutter shaft 29. Power for the stalk cutting and conveying means, which is not required in such large amounts, is then transmitted through the chain 28 to the shaft 26 alongside the conveyer 23.

While applicant has shown and described a preferred embodiment of his improved ensilage harvester, it is to be understood that he claims as his invention all modifications falling within the scope of the appended claims.

What is claimed is:

1. A harvester comprising, in combination with a tractor having a power take-off, a wheeled harvester frame connected to the tractor and extending rearwardly therefrom, a harvesting unit mounted on said frame, a conveyer mounted on the frame extending from the harvesting unit forwardly to a point adjacent the tractor, and a material reducing device mounted on the frame at the forward end positioned to receive material from the conveyer, said device including means for delivering the material therefrom.

2. A harvester comprising, in combination with a tractor having a power take-off, a wheeled harvester frame connected to the tractor and extending rearwardly therefrom in offset relation with respect to the tractor, a harvesting unit mounted on said frame, a conveyer mounted on the frame extending diagonally from the harvesting unit forwardly to a point adjacent the tractor, and a material reducing device mounted on the frame at the forward end positioned to receive material from the conveyer, said device including means for delivering the material therefrom.

3. A harvester comprising, in combination with a tractor having a laterally extending draft frame, a wheeled harvester frame connected to the tractor, a harvesting unit mounted on said frame, a conveyer mounted on the frame extending from the harvesting unit forwardly to a point adjacent the tractor, a material reducing device mounted on the frame at the forward end positioned to receive material from the conveyer, a wheel supported receiving means connected to the laterally extending draft frame, and means for delivering material from the reducing device to said receiving means.

4. A harvester comprising, in combination with a tractor having a power take-off, a rearwardly extending drawbar and a laterally extending draft frame, a wheeled harvester frame pivotally connected to the drawbar and extending rearwardly therefrom in offset relation with respect to the tractor, a harvesting unit mounted on said frame, a conveyer mounted on the frame extending from the harvesting unit forwardly to a point adjacent the drawbar, a material reducing device mounted on the frame at the forward end positioned to receive material from the conveyer, said machine including a blower for delivering the material therefrom, power take-off connections for driving the harvesting unit, the conveyer and the reducing means from the tractor, a wheel supported receiving means connected to the laterally extending draft frame, and means for delivering material from the blower to said receiving means.

5. An ensilage harvester comprising, in combination with a tractor having a power take-off, a wheel supported frame structure flexibly connected to the tractor, means on said frame structure for cutting corn and conveying it rearwardly with the stalks in a substantially vertical position, a conveyer mounted on the frame structure and extending forwardly thereon, means acting in conjunction with the conveying means for delivering the stalks on the conveyer in a prone position with the head ends in the direction of movement of the conveyer, and a material reducing device mounted at the forward end of the frame structure for receiving the stalks delivered by the conveyer, and means for driving the cutting and conveying mechanisms and the reducing device from the power take-off of the tractor.

6. An ensilage harvester comprising, in combination with a tractor having a power take-off, a wheel supported frame structure flexibly connected to the tractor in an offset position, means on said frame structure for cutting corn and conveying it rearwardly with the stalks in a substantially vertical position, a conveyer mounted on the frame structure and extending forwardly and diagonally thereon, means acting in conjunction with the conveying means for delivering the stalks on the conveyer in a prone position with the head ends in the direction of movement of the conveyer, and a material reducing device mounted at the forward end of the frame structure for receiving the stalks delivered by the conveyer, and means for driving the cutting and conveying mechanisms and the reducing device from the power take-off of the tractor.

7. An ensilage harvester comprising, in combination with a tractor having a power take-off, a wheel supported frame structure flexibly connected to the tractor, means on said frame structure for cutting corn and conveying it rearwardly with the stalks in a substantially vertical position, a conveyer mounted on the frame structure and extending forwardly thereon, means acting in conjunction with the conveying means for delivering the stalks on the conveyer in a prone position with the head ends in the direction of movement of the conveyer, said conveyer being of a length sufficient to receive the stalks of the maximum length in said position, and a material reducing device mounted at the forward end of the frame structure for receiving the stalks delivered by the conveyer head ends first, and means for driving the cutting and conveying mechanisms and the reducing device from the power take-off of the tractor.

8. An ensilage harvester comprising, in combination with a tractor having a power take-off, a laterally extending draft frame connected to the tractor, a wheel supported frame structure flexibly connected to the tractor, means on said frame structure for cutting corn and conveying it rearwardly with the stalks in a substantially vertical position, a conveyer mounted on the frame structure and extending forwardly thereon, means acting in conjunction with the conveying means for delivering the stalks on the conveyer in a prone position with the head ends in the direction of movement of the conveyer, an ensilage cutting device mounted at the forward end of the frame structure for receiving the stalks delivered by the conveyer head end first, means for driving the cutting and conveying mechanisms and the ensilage cutting device from the power take-off of the tractor, a wheel supported receptacle connected to the draft frame and positioned alongside the cutting device, and means for delivering ensilage from the device to the receptacle.

ANDREW KOWALSKY.